United States Patent
Kono et al.

(10) Patent No.: US 11,476,543 B2
(45) Date of Patent: Oct. 18, 2022

(54) ALKALINE STORAGE BATTERY AND METHOD OF MANUFACTURING THE SAME

(71) Applicant: KABUSHIKI KAISHA TOYOTA JIDOSHOKKI, Kariya (JP)

(72) Inventors: Satoshi Kono, Aichi-ken (JP); Motoaki Okuda, Aichi-ken (JP); Atsushi Minagata, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 206 days.

(21) Appl. No.: 17/043,896

(22) PCT Filed: Mar. 19, 2019

(86) PCT No.: PCT/JP2019/011551
§ 371 (c)(1),
(2) Date: Sep. 30, 2020

(87) PCT Pub. No.: WO2019/193972
PCT Pub. Date: Oct. 10, 2019

(65) Prior Publication Data
US 2021/0020888 A1   Jan. 21, 2021

(30) Foreign Application Priority Data
Apr. 5, 2018 (JP) .............................. JP2018-073346

(51) Int. Cl.
*H01M 50/46* (2021.01)
*H01M 10/28* (2006.01)
(Continued)

(52) U.S. Cl.
CPC ............. *H01M 50/46* (2021.01); *H01M 4/62* (2013.01); *H01M 10/0468* (2013.01);
(Continued)

(58) Field of Classification Search
CPC .... H01M 50/46; H01M 50/489; H01M 50/44; H01M 50/491; H01M 4/62; H01M 4/043;
(Continued)

(56) References Cited

U.S. PATENT DOCUMENTS

2002/0076615 A1* 6/2002 Tanaka ................. H01M 50/411
428/167

FOREIGN PATENT DOCUMENTS

JP   H-10172533 A   *   6/1998   ............ H01M 2/162
JP   2002-151156 A       5/2002
(Continued)

OTHER PUBLICATIONS

EPO machine generated English translation of JP 2018-028982A (Year: 2018).*
(Continued)

*Primary Examiner* — Christopher P Domone
*Assistant Examiner* — Kimberly Wyluda
(74) *Attorney, Agent, or Firm* — Sughrue Mion, PLLC (57) ABSTRACT

An alkaline storage battery includes a plurality of foil electrodes that each have a metal foil and an active material layer. The active material layers are arranged in such a manner that adjacent two of the active material layers face each other. Separators which are each interposed between the adjacent two of the active material layers. The separators are each a nonwoven fabric including fibers as protruding portions. The active material layers have a large number of active material particles which adhere to each other, and spaces formed between the active material particles, as fitting portions. The fibers are engaged with the spaces while the fibers enter the spaces.

5 Claims, 4 Drawing Sheets (51) Int. Cl.
   *H01M 50/44*   (2021.01)
   *H01M 50/489*  (2021.01)
   *H01M 50/491*  (2021.01)
   *H01M 4/62*    (2006.01)
   *H01M 10/04*   (2006.01)
   *H01M 4/02*    (2006.01)
   *H01M 4/04*    (2006.01)

(52) U.S. Cl.
   CPC ............ *H01M 10/28* (2013.01); *H01M 4/043* (2013.01); *H01M 50/44* (2021.01); *H01M 50/489* (2021.01); *H01M 50/491* (2021.01); *H01M 2004/021* (2013.01); *H01M 2004/029* (2013.01)

(58) Field of Classification Search
   CPC ............ H01M 10/0468; H01M 10/28; H01M 2004/021; H01M 2004/029
   See application file for complete search history.

(56) References Cited

FOREIGN PATENT DOCUMENTS

| | | | |
|---|---|---|---|
| JP | 2003-045477 A | | 2/2003 |
| JP | 2015185259 A | * | 10/2015 |
| JP | 2018-028982 A | | 2/2018 |
| JP | 2018-049794 A | | 3/2018 |

OTHER PUBLICATIONS

EPO machine generated English translation of JPH 10172533A (Year: 1998).*
EPO machine generated English translation of JP 2015-185259A (Year: 2015).*
Communication dated Dec. 1, 2021 from the Intellectual Property Office of India in Indian Application No. 202017041266.

* cited by examiner

ALKALINE STORAGE BATTERY AND METHOD OF MANUFACTURING THE SAME

CROSS-REFERENCE TO RELATED APPLICATIONS

This application is a National Stage of International Application No. PCT/JP2019/011551 filed Mar. 19, 2019, claiming priority based on Japanese Patent Application No. 2018-073346 filed Apr. 5, 2018, the contents of all of which are incorporated herein by reference in their entirety.

TECHNICAL FIELD

The present invention relates to an alkaline storage battery and a method of manufacturing the same.

BACKGROUND ART

An alkaline storage battery is sometimes used as the battery for vehicles, such as a forklift, a hybrid vehicle, and an electric vehicle. Such an alkaline storage battery has an electrode assembly in which a plurality of positive electrodes and a plurality of negative electrodes are alternately stacked with a separator therebetween. A porous material, such as a nonwoven fabric and a microporous film is used as the separator, and electrolyte is retained in pores of the separator. In addition, each separator is disposed in close contact with an electrode adjacent to the separator so as to supply the electrolyte that is retained in the separator to the electrode quickly.

When the alkaline storage battery is charged and discharged, gas may be generated from the positive electrodes and the negative electrodes. When pressure inside the alkaline storage battery is increased by generation of the gas, a space is formed between each separator and the electrode adjacent to the separator, thereby causing an uneven electrode reaction. To avoid such a problem, a technique that interposes a polymer-containing layer having water-absorbency and adhesion between each of the separators and the positive electrodes, and between the separator and the negative electrode is proposed (Patent Document 1).

CITATION LIST

Patent Document

Patent Document 1: Japanese Patent Application Publication No. 2003-45477

SUMMARY OF INVENTION

Technical Problem

When a polymer-containing layer is provided between each separator and the electrode adjacent to the separator as is the case with an alkaline secondary battery of Patent Document 1, polymers forming the polymer-containing layer are attached to circumferential edge portions of pores on a surface of the separator. A diameter of the pores on the surface of the separator tends to be smaller by the presence of the polymer, compared with an alkaline secondary battery which does not have the polymer-containing layer. In addition, the pores of the separator may be completely occluded depending on an amount of the polymer attached to the circumferential edge portions of the pores.

Thus, in a case where the polymer-containing layer is provided between each separator and the electrode adjacent to the separator, flow resistance of the electrolyte flowing from the separator to the electrode is increased, compared with the case where the polymer-containing layer is not provided, so that there may be delays in supplying the electrolyte to the electrode from the separator. As a result, an uneven electrode reaction occurs in the active material layer, so that internal resistance of the alkaline secondary battery may be increased.

The present invention has been made in view of the above-described background, and is directed to providing an alkaline storage battery in which formation of space between each separator and an active material layer adjacent to the separator is restrained and electrolyte is quickly supplied to the active material layer from the separator, and a method of manufacturing the alkaline storage battery.

Solution to Problem

One embodiment of the present invention is an alkaline storage battery that includes a plurality of foil electrodes that each have a metal foil and an active material layer that is disposed on one surface or both surfaces of the metal foil, wherein in the plurality of the foil electrodes, the active material layers are arranged in such a manner that adjacent two of the active material layers face each other, and separators which are each interposed between the adjacent two of the adjacent active material layers. The separators are each a nonwoven-fabric including a large number of fibers as protruding portions which protrude toward the active material layers. The active material layers have a large number of active material particle which adhere to each other and spaces formed between the active material particles, as fitting portions into which the protruding portions of the separators are fitted. The fibers are engaged with the spaces while the fibers enter the spaces. A 50% cumulative particle size D [μm] of the active material particles based on volume, an average hole diameter A [μm] of the separators, and an average fiber diameter B [μm] of the separators satisfy a relationship of the following expression (1):

$$0.2 < D/(A+B) < 1.5 \quad (1)$$

Another embodiment of the present invention is a method of manufacturing the alkaline storage battery according to the embodiment that includes a stacking process in which the foil electrodes and the separators are alternately stacked with each other to manufacture an electrode assembly, and impregnated with electrolyte, and a compressing process in which portions of the separators are pressed into the active material layers by compressing the electrode assembly in a stacking direction thereof, so that the protruding portions and the fitting portions are engaged with each other.

Advantageous Effects of Invention

The alkaline storage battery has a plurality of foil electrodes and a plurality of separators, which are alternately stacked with each other. Each separator has protruding portions that protrude toward the active material layers of the foil electrode, and the active material layer has the fitting portions into which the protruding portions of the separator are fitted. The protruding portions of the separator are engaged with the fitting portions of the active material layer while the protruding portions enter into the fitting portions. Thus, the separator is held on the active material layer by engaging the separator with the active material layer, thereby restraining formation of space between the separator and the active material layer adjacent to the separator.

In addition, as described above, each separator is held on the active material layer adjacent to the separator by an engagement of protruding portions of the separator with fitting portions of the active material layer in the alkaline storage battery. Thus, the alkaline storage battery need not have a layer such as an adhesive agent layer which is disposed between the separator and the active material layer adjacent to the separator and improves the adhesion therebetween. Therefore, in the alkaline storage battery, the electrolyte may be quickly supplied to the active material layer from the separator.

As described above, in the alkaline storage battery, the formation of the space between each separator and the active material layer adjacent to the separator may be restrained, and the electrolyte may be quickly supplied to the active material layer from the separator.

In addition, in the method of manufacturing the alkaline storage battery, after the electrode assembly which is impregnated with electrolyte is manufactured by the stacking process, the electrode assembly is compressed by the compressing process. Thus, the compressing process is performed while the electrode assembly is impregnated with the electrolyte, so that a portion of each separator is easily pressed into the active material layer, and the protruding portions and the fitting portions are engaged with each other.

As a result, the alkaline storage battery may be easily manufactured by the method of manufacturing the alkaline storage battery.

DESCRIPTION OF EMBODIMENTS

Foil electrodes of the alkaline storage battery each have a metal foil as a current collector and active material layers that are each formed on one surface or both surfaces of the metal foils. As long as the alkaline storage battery includes one or more cell units in which a positive electrode active material layer and a negative electrode active material layer as the active material layers face each other with a separator interposed therebetween, the foil electrodes of any embodiment may be employed.

For example, the alkaline storage battery may include positive electrodes that each have a positive electrode active material layer as the active material layer on one surface or both surfaces of the metal foils and negative electrodes that each have a negative electrode active material layer as the active material layer on one surface or both surfaces of the metal foils. When these monopolar electrodes are used as the foil electrodes, the cell unit may be configured by stacking the positive electrode and the negative electrode alternately with the separator interposed therebetween.

In addition, the foil electrodes may be a bipolar electrode that has the positive electrode active material layer as the active material layers disposed on one surface of the metal foils and the negative electrode active material layer as the active material layers disposed on the other surface of the metal foils. In this case, each of the positive electrode active material layers and the negative electrode active material layers may face each other with the separator interposed therebetween by a simple configuration in which a plurality of bipolar electrodes are stacked with the separator therebetween.

When the bipolar electrodes are used, the number of cell units relative to a total number of electrodes may be increased, compared with when the monopolar electrodes are used. Thus, using the bipolar electrodes decreases the total number of the electrodes, compared with using the monopolar electrodes, so that a size of the alkaline storage battery in a stacking direction of the foil electrodes and the separators may be further reduced.

On the other hand, when the bipolar electrodes are used, each cell unit is formed between two adjacent metal foils. In this configuration, a width of the cell unit when the bipolar electrodes are used in the stacking direction of the foil electrodes and the separators is smaller than that of the cell unit when the monopolar electrodes are used. Accordingly, in this case, there is a problem in which internal pressure of the cell unit tends to be increased when gas is generated from the positive electrode active material layers and the negative electrode active material layers.

However, as described above, each separator may be firmly held on the active material layer adjacent to the separator by an engagement of protruding portions of the separator with fitting portions of the active material layer in the alkaline storage battery. Thus, the separator may be restrained from being peeled off from the active material layer, even when the bipolar electrodes are used as the foil electrodes.

Accordingly, in the above-described alkaline storage battery, using the bipolar electrodes as the foil electrodes may further reduce the size of the alkaline storage battery in the stacking direction of the foil electrodes and the separators, and restrain each separator from being peeled off from the active material layer adjacent to the separator.

In the alkaline storage battery, each separator has the protruding portions that protrude toward the active material layers, and each active material layer has the fitting portions into which the protruding portions of the separator are fitted. The protruding portions are engaged with the fitting portions while the protruding portions enter into the fitting portions. In other words, the protruding portions are held by the fitting portion while at least a part of the protruding portions is embedded into or entangled with the fitting portions.

Shapes of the protruding portions and the fitting portions are not particularly limited. As long as the protruding portions and the fitting portions are engageable with each other, any shape may be allowed.

The protruding portions of each separator may be pressed into both of the positive electrode active material layer and the negative electrode active material layer and engaged with the fitting portions formed on these active material layers, or may be pressed into either of the positive electrode active material layer or the negative electrode active material layer and engaged with the fitting portions formed on the active material layer into which the protruding portions are pressed.

It is preferable that the protruding portions of each separator are engaged with the fitting portions formed on the positive electrode active material layer adjacent to the separator. In the alkaline storage battery, gas from the positive electrode active material layer is generated more frequently than that from the negative electrode active material layer, so that a space between the positive electrode active material layer and the separator tends to be formed. Therefore, engaging the protruding portions and the fitting portions formed on the positive electrode active material layer with each other more effectively restrains formation of space between the positive electrode active material layer and the separator.

The protruding portions may be provided in advance on the separators that are to be stacked on the foil electrodes. In this case, after an electrode assembly is manufactured by stacking the separators and the foil electrodes alternately, the electrode assembly is compressed in the stacking direction of the electrode assembly, thereby pressing the protruding portions into each active material layer. Thus, the protruding portions and the fitting portions are engaged with each other while the fitting portions are formed on each active material layer. Similar to the protruding portions, the fitting portions may be provided in advance on the active material layers of the foil electrodes that are to be stacked on the separators. In this case, compressing the electrode assembly in the stacking direction presses each separator into the fitting portions. Thus, the protruding portions and the fitting portions are engaged with each other while the protruding portions are formed on each separator. Furthermore, the protruding portions may be provided in advance on the separators, and the fitting portions may be provided in advance on the active material layers.

In addition, the protruding portions and the fitting portions may be formed and also engaged with each other by a simple process, in which the electrode assembly without the protruding portions and the fitting portions provided in advance is compressed in the stacking direction of the electrode assembly, due to a combination of a material of the separators and a configuration of the active material layers. In view of this, it is preferable that a nonwoven fabric that includes a large number of fibers is employed as the separator, and the alkaline storage battery includes the active material layers that have a large number of active material particles adhering to each other and spaces formed between these active material particles.

The spaces between the active material particles located on a surface of each active material layer serve as the fitting portions by pressing the separator made of nonwoven fabric into the active material layer containing a large number of active material particles, so that the fibers of the separator may be pressed into the spaces between the active material particles. As a result, while the protruding portions may be formed by protruding parts of the fibers of each separator toward the active material layer adjacent to the separator, the protruding portions are embedded into the spaces as the fitting portions, so that the protruding portions and the fitting portions may be engaged with each other.

In addition, the protruding portions which spread over each separator in a mesh-like shape may be formed and the mesh-like fitting portions corresponding to the protruding portions may be formed on the active material layer by pressing the fibers into the active material layer, due to the fibers of the nonwoven fabric which are entangled with each other at random. Engaging the protruding portions which spread over the separator in the mesh-like shape with the fitting portions holds the separator on the active material layer adjacent to the separator more firmly, and restrains the formation of the space between the active material layer and the separator more effectively.

Furthermore, in this case, the protruding portions and the fitting portions are formed by the simple process in which the electrode assembly is compressed in the stacking direction of the electrode assembly, so that processes in which the protruding portions are provided on the separators and the fitting portions are provided on the active material layers in advance are not required. Therefore, this configuration may avoid complication of a manufacturing process of the alkaline storage battery, wherein the complication is caused by these processes.

In the case described above, it is preferable that a 50% cumulative particle size D [μm] of the active material particles based on volume, an average hole diameter A [μm] of the separator, and an average fiber diameter B [μm] of the separator satisfy a relationship of the following expression (1).

$$0.2 < D/(A+B) < 1.5 \quad (1)$$

When the above relationship is satisfied, the spaces between the active material particles located on a surface of each active material layer and gaps between the fibers forming the separator are easy to match with each other. Thus, the fibers of each separator are easily pressed into the spaces between the active material particles by compressing the electrode assembly in the stacking direction thereof. As a result, the separator is more firmly held on the active material layer adjacent to the separator, so that the formation of the space between the separator and the active material layer adjacent to the separator is restrained more effectively.

When the 50% cumulative particle size D of the active material particles, the average hole diameter A, and the average fiber diameter B of the separators do not satisfy the above expression (1), the spaces between the active material particles and the gaps between the fibers of each separator are difficult to match with each other, compared with when the 50% cumulative particle size D of the active material particles, the average hole diameter A and the average fiber diameter B of the separators satisfy the above expression (1). Therefore, in this case, there is fear that the a space tends to be formed between each separator and the positive electrode active material layer adjacent to the separator, compared with when the 50% cumulative particle size D of the active material particles, the average hole diameter A and the average fiber diameter B of the separators satisfy the relationship of the above expression (1).

In addition, in the above case, it is preferable that the average fiber diameter B [μm] of the separators is smaller than the 50% cumulative particle size D [μm] of the active material particles based on volume. In this case, the fibers exposed on a surface of each separator are easy to enter into the spaces between the active material particles located on a surface of each active material layer. Thus, the fibers exposed on the surface of the separator are easily pressed into the spaces between the active material particles by compressing the electrode assembly in the stacking direction thereof. As a result, the separator is more firmly held on the active material layer adjacent to the separator, so that the formation of the space between the separator and the active material layer adjacent to the separator is restrained more effectively.

The following will describe an exemplary embodiment of each part of the above-described alkaline storage battery.

The metal foils as the current collector are a chemically inactive electrical conductor and supply current to the electrodes continuously while the alkaline storage battery is discharged or charged. A metal which may withstand voltage by which a reaction of the active material occurs may be employed as the material of the metal foils. Examples of the material of the metal foils include pure metals such as silver, copper, gold, aluminum, tungsten, cobalt, zinc, nickel, iron, platinum, tin, indium, titanium, ruthenium, tantalum, chromium, and molybdenum; and alloys such as stainless steel and aluminum alloys. In addition, the metal foils which are surface treated, such as nickel-plated copper foil and nickel-plated stainless-steel foil may be also employed as the metal foils.

When the alkaline storage battery is a nickel-hydrogen storage battery, it is preferable that a nickel foil, a nickel-plated copper foil, and a nickel-plated stainless-steel foil are employed as the metal foils. A thickness of the metal foils may be selected as appropriate in a range, for example, from 5 to 100 μm.

Each active material layer is disposed on one surface of the metal foil or on both surfaces of the metal foil. The active material layer generally contains a large number of active material particles and a binder which bonds the active material particles to each other, and the active material particles to the metal foil. Furthermore, the active material layer may contain an additive, such as a conductive assistant as appropriate.

Specific components of the active material layer may be selected as appropriate on the basis of a configuration of the alkaline storage battery and polarity of the active material layer. For example, when the active material layer is the positive electrode active material layer of the nickel-hydrogen storage battery, a nickel hydroxide and a metal-doped nickel hydroxide may be employed as the positive electrode active material particles. Examples of the metal with which the nickel hydroxide is doped include a group 2 element such as magnesium and calcium; a group 9 element such as cobalt, rhodium and iridium; and a group 12 element such as zinc and cadmium. A surface treatment which is a known method for nickel-hydrogen storage batteries may be performed on the positive electrode active material particles.

The 50% cumulative particle size of the positive electrode active material particles based on volume may be selected as appropriate in a range, for example, from 1 to 100 μm. The 50% cumulative particle size of the positive electrode active material particles based on volume is preferably 3 to 50 μm, more preferably 5 to 30 μm, and still more preferably 7 to 18 μm. It is noted that the above-described 50% cumulative particle size based on volume is calculated on the basis of the particle size distribution measured by a laser diffraction particle size distribution analyzer.

A content of the positive electrode active material particles in the positive electrode active material layer is selected as appropriate, for example, in a range from 75 to 99 mass percent. The content of the positive electrode active material particles is preferably 80 to 97 mass percent, and more preferably 85 to 95 mass percent.

The positive electrode active material layer of the nickel-hydrogen storage battery may contain one kind or two kinds of metallic cobalt and cobalt compound as a conductive assistant. For example, a cobalt hydroxide may be employed as the cobalt compound. The metallic cobalt and the cobalt compound may be contained in a form of powder in the positive electrode active material layer, and adhere to surfaces of the positive electrode active material particles.

A content of the metallic cobalt and the cobalt compound in the positive electrode active material layer may be selected in a range, for example, from 0.5 to 10 mass percent. The content of the metallic cobalt and the cobalt compound is preferably 1 to 7 mass percent, and more preferably 2 to 5 mass percent.

The positive electrode active material layer of the nickel-hydrogen storage battery may further contain a conductive assistant except for the metallic cobalt and the cobalt compound. Examples of such a conductive assistant include metals such as nickel and copper; oxides or hydroxides of these metals; and carbon materials such as carbon black, graphite, and carbon fiber.

The positive electrode active material layer of the nickel-hydrogen storage battery may further contain a positive electrode additive which improves a battery performance. Examples of the positive electrode additive include niobium compounds such as $Nb_2O_5$; tungsten compounds such as $WO_2$, $WO_3$, $Li_2WO_4$, $Na_2WO_4$, and $K_2WO_4$; ytterbium compounds such as $Yb_2O_3$; titanium compounds such as $TiO_2$; yttrium compounds such as $Y_2O_3$; zinc compounds such as $ZnO$; calcium compounds such as $CaO$, $Ca(OH)_2$, and $CaF_2$; and oxides of rare earth elements except for the above described elements.

A content of the positive electrode additive in the positive electrode active material layer may be selected as appropriate in a range, for example, from 0.1 to 10 mass percent. The content of the positive electrode additive is preferably 0.5 to 5 mass percent.

When the active material layer is the negative electrode active material layer of the nickel-hydrogen storage battery, a hydrogen storage alloy may be employed as the negative electrode active material particles. Examples of the hydrogen storage alloy include an $AB_5$-type hydrogen storage alloy having a $CaCu_5$-type hexagonal crystal structure, an $AB_2$-type hydrogen storage alloy having a $MgZn_2$-type hexagonal crystal structure or a $MgCu_2$-type cubic crystal structure, an AB-type hydrogen storage alloy having a CsCl-type cubic crystal structure, an $A_2B$-type hydrogen storage alloy having a $Mg_2Ni$-type hexagonal crystal structure, and a solid solution-type hydrogen storage alloy having a body-centered cubic crystal structure. In addition, examples of the hydrogen storage alloy include an $AB_3$-type hydrogen storage alloy; an $A_2B_7$-type hydrogen storage alloy; and a hydrogen storage alloy, such as $A_5B_{19}$-type hydrogen storage alloy, which is formed in combination with an $AB_5$-type crystal structure and $AB_2$-type crystal structure. These hydrogen storage alloys may be used independently or in combination of 2 or more types.

More specifically, the $AB_5$-type hydrogen storage alloy may include, for example, $LaNi_5$, $CaCu_5$, and $MmNi_5$. It is noted that the above-described Mm is a symbol showing a so-called mischmetal. Examples of the $AB_2$-type hydrogen storage alloy include $MgZn_2$, $ZrNi_2$, and $ZrCr_2$. Examples of the AB-type hydrogen storage alloy include TiFe and TiCo. Examples of the $A_2B$-type hydrogen storage alloy include $Mg_2Ni$ and $Mg_2Cu$. Examples of the solid solution-type hydrogen storage alloy include Ti—V, V—Nb, and Ti—Cr.

Examples of the $AB_3$-type hydrogen storage alloy include $CeNi_3$. Examples of the $A_2B_7$-type hydrogen storage alloy include $Ce_2Ni_7$. Examples of the $A_5B_{19}$-type hydrogen storage alloy include $Ce_5Co_{19}$ and $Pr_5Co_{19}$. A part of elements forming these hydrogen storage alloys may be replaced with other elements.

A known surface treatment for nickel-hydrogen storage battery may be performed on the negative electrode active material particles. For example, an alkaline treatment that immerses the negative electrode active material particles in alkaline aqueous solution may be performed.

The 50% cumulative particle size of the negative electrode active material particles based on volume may be selected as appropriate in a range, for example, from 1 to 100 μm. The 50% cumulative particle size of the negative electrode active material particles based on volume is preferably 3 to 50 μm, more preferably 5 to 30 μm, and still more preferably 7 to 18 μm.

In addition, a content of the negative electrode active material particles in the negative electrode active material layer may be selected as appropriate in a range, for example, from 85 to 99 mass percent. The content of the negative electrode active material particles is preferably 90 to 98 mass percent.

In the negative electrode active material layer of the nickel-hydrogen storage battery, a conductive assistant which is configured of a chemically inactive electrical conductor may further be contained. Examples of such a conductive assistant include metals such as cobalt, nickel and copper; oxides or hydroxides of these metals; and carbon materials such as carbon black, graphite, and carbon fiber. These conductive assistants may be contained in a form of powder in the negative electrode active material layer, and adhere to surfaces of the negative electrode active material particles.

A content of the conductive assistant in the negative electrode active material layer may be selected as appropriate in a range, for example, from 0.1 to 5 mass percent. The content of the conductive assistant is preferably 0.2 to 3 mass percent, and more preferably 0.3 to 1 mass percent.

Furthermore, the negative electrode active material layer of the nickel-hydrogen storage battery may further contain a negative electrode additive which improves a battery performance. Examples of the negative electrode additive include fluorides of rare-earth elements such as $CeF_3$ and $YF_3$; bismuth compounds such as $Bi_2O_3$ and $BiF_3$; and indium compounds such as $In_2O_3$ and $InF_3$. In addition, the above-described positive electrode additive may be used as the negative electrode additive.

A content of the negative electrode additive in the negative electrode active material layer may be selected as appropriate in a range, for example, from 0.1 to 10 mass percent. The content of the negative electrode additive is preferably 0.5 to 5 mass percent.

Examples of the binder contained in the active material layer include fluororesin such as polyvinylidene fluoride, polytetrafluoroethylene, and fluoro rubber; polyolefin such as polypropylene and polyethylene; imide resin such as polyimide and polyamide-imide; cellulose derivative such as carboxymethyl cellulose, methylcellulose and hydroxypropyl cellulose; (meth)acrylic resin that contains (meth) acrylic acid derivative such as polyacrylic acid, polyacrylic acid ester, polymethacrylic acid and polymethacrylic acid ester as a monomer unit; and styrene butadiene rubber.

A content of the binder in the active material layer may be selected as appropriate, in a range, for example, from 0.1 to 15 mass percent. The content of the binder is preferably 1 to 10 mass percent, and more preferably 2 to 7 mass percent.

Furthermore, it is preferable that carboxymethyl cellulose as a thickener is contained in the active material layers. The active material layers containing the carboxymethyl cellulose tend to be softened by impregnating the active material layers with electrolyte, compared with the active material layers before impregnation with the electrolyte. Thus, impregnating the active material layers containing the carboxymethyl cellulose with the electrolyte may more easily press a portion of each separator into each active material layer adjacent to the separator. As a result, the separator is more firmly held on the active material layer adjacent to the separator, so that the formation of the space between the separator and the active material layer adjacent to the separator is restrained more effectively.

A porous film, a nonwoven fabric, a woven fabric, etc. made of insulator having a chemical stability relative to electrolyte may be used as the separator. Examples of the insulator forming the separator include synthetic resin such as polytetrafluoroethylene, polypropylene, polyethylene, ethylene-propylene copolymer, polyimide, polyamide, polyester and polyacrylonitrile; polysaccharide such as cellulose and amylose; and natural polymer such as fibroin, keratin, lignin, and suberin. These insulators may be used independently or in combination of 2 or more types.

In addition, hydrophilic treatments, such as sulfonation treatment, corona treatment, fluorine gas treatment, and plasma treatment may be performed on the separator.

When the alkaline storage battery is the nickel-hydrogen storage battery, it is preferable that a nonwoven fabric made of polyolefin such as polypropylene, polyethylene, ethylene-propylene copolymer is employed as the separator. In this case, an average hole diameter of the nonwoven fabric is preferably 10 to 25 μm. In addition, an average fiber diameter of the nonwoven fabric is preferably 2 to 10 μm.

It is noted that the average hole diameter of the nonwoven fabric is calculated by bubble point method that is specified in JIS K 3832:1990. In addition, the average fiber diameter of the nonwoven fabric is defined as an average value of fiber diameters of ten fibers which are randomly selected from a SEM image of a surface of the nonwoven fabric. The SEM image is obtained by observing the surface of the nonwoven fabric by a scanning electric microscope.

In manufacturing the alkaline storage battery, the method of manufacturing the alkaline storage battery having a stacking process and a compressing process may be employed. In the stacking process, the foil electrodes and the separators are alternately stacked with each other to manufacture the electrode assembly, and impregnated with the electrolyte. In the compressing process, portions of the separators are pressed into the active material layers by compressing the electrode assembly in the stacking direction thereof, so that the protruding portions and the fitting portions are engaged with each other.

In the stacking process, the process in which the foil electrodes and the separators are alternately stacked with each other and the process in which the foil electrodes and the separators are impregnated with the electrolyte may be performed in random order. For example, after the electrode assembly is manufactured by stacking the foil electrodes and the separators alternately, the electrode assembly may be impregnated with the electrolyte. In addition, after the foil electrodes and the separators are impregnated with the electrolyte, the foil electrode and the separators may be alternately stacked with each other to manufacture the electrode assembly.

Known electrolyte for the alkaline storage battery may be used as the electrolyte. When the alkaline storage battery is the nickel-hydrogen storage battery, aqueous solution of a hydroxide of alkali metals such as lithium hydroxide, sodium hydroxide, and potassium hydroxide may be employed as the electrolyte. These hydroxides of the alkali metals may be used independently or in combination of 2 or more types.

Furthermore, the electrolyte may further contain halides of the alkali metals, such as LiF, LiCl, LiBr, LiI, NaF, NaCl, NaBr, NaI, KF, KCl, KBr, and KI.

In the compressing process, the electrode assembly is compressed in the stacking direction of the foil electrodes and the separators. In the compressing process, end surfaces of the electrode assembly in the stacking direction thereof may be directly compressed, or the end surfaces of the electrode assembly in the stacking direction are covered with other member, such as a case, and the electrode assembly may be compressed with the member interposed. In the latter case, a whole electrode assembly may be uniformly compressed by enhancing stiffness of the member that is disposed on the end surfaces of the electrode assembly.

In the compressing process, the electrode assembly is preferably compressed in the stacking direction thereof at pressure of 0.1 MPa or more and 1.5 MPa or less, more preferably at pressure of 0.15 MPa or more and 1.3 MPa or less in the stacking direction, and still more preferably at pressure of 0.2 MPa or more and 1.0 MPa or less in the stacking direction.

When pressure less than 0.1 MPa is applied to the electrode assembly, the electrode assembly is lack of the compressing amount, so that it may be difficult that the protruding portions are engaged with the fitting portion. When pressure more than 1.5 MPa is applied to the electrode assembly, the compressing amount of the separator is excessively large, so that a reduction of a porosity of the separator may be caused. As a result, the electrolyte becomes difficult to move in the separators, thereby causing an increase of the resistance of the alkaline storage battery.

Example 1

Figure 1:
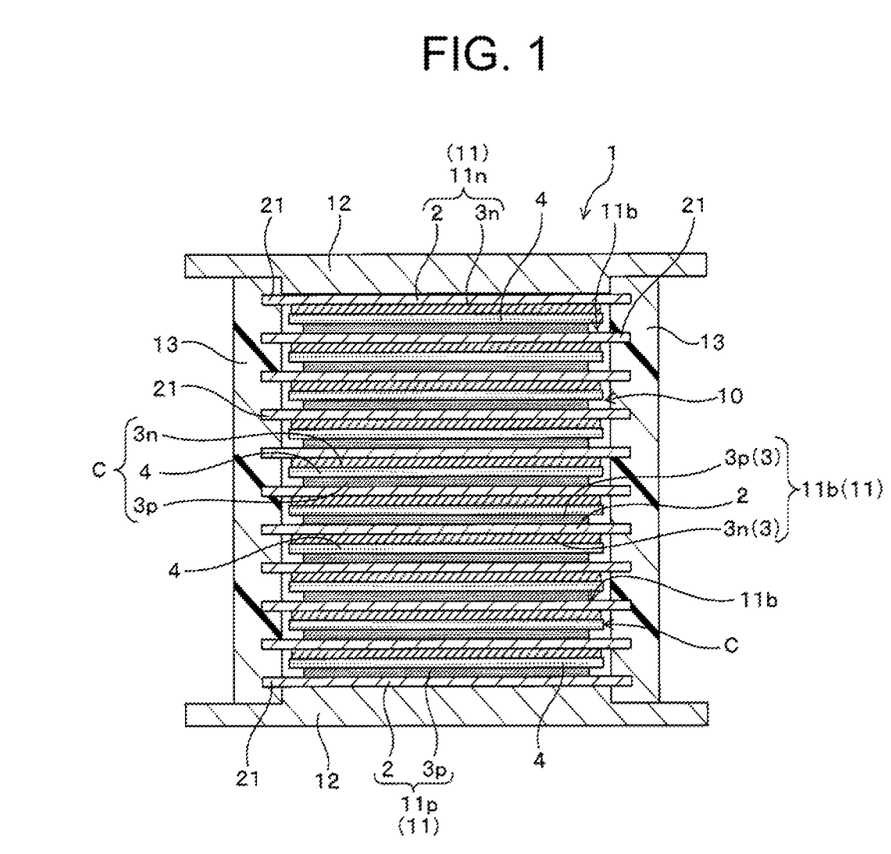
FIG. 1 is a cross-sectional view illustrating a main part of an alkaline storage battery according to a first embodiment.
Figure 2:
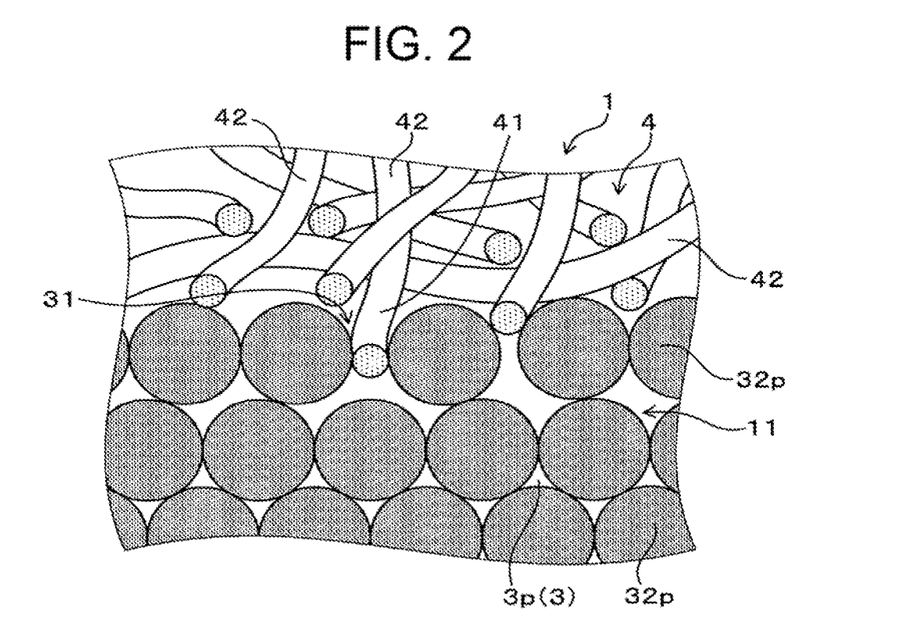
FIG. 2 is an enlarged view of protruding portions formed on a separator and fitting portions formed on a positive electrode active material layer in FIG. 1.

An example of the alkaline storage battery will be described with reference to FIG. 1 to FIG. 4. Referring to FIG. 1, an alkaline storage battery 1 of the present example includes a plurality of foil electrodes 11 (11b,11n,11p) that each have a metal foil 2 and an active material layer 3 (3p, 3n) that is disposed on one surface or both surfaces of the metal foil 2, and separators 4 which are each interposed between two adjacent active material layers 3. In the plurality of foil electrodes 11 (11b, 11n, 11p), the active material layers 3 are arranged in such a manner that two adjacent active material layers 3 face each other. Referring to FIG. 2, the separators 4 have protruding portions 41 which protrude toward the active material layers 3. In addition, referring to FIG. 2 and FIG. 3, the active material layers 3 have fitting portions 31 into which the protruding portions 41 of the separators 4 are fitted. As shown in FIG. 2, the protruding portions 41 of each separator are engaged with the fitting portions 31 of each active material layer 3 while the protruding portions 41 enter the fitting portion 31.

The following will describe a configuration of the alkaline storage battery 1 of the present example in detail. The alkaline storage battery 1 of the present example is configured as a nickel-hydrogen storage battery. Referring to FIG. 1, the alkaline storage battery 1 has an electrode assembly 10 in which the plurality of foil electrodes 11 are stacked with the separator 4 interposed therebetween, bundling members 12 which are in contact with end portions of the electrode assembly 10 in a stacking direction thereof, and bundle the electrode assembly 10, and a seal member 13 that seals a side circumferential surface of the electrode assembly 10. The electrode assembly 10 has terminal electrodes 11n, 11p that are each disposed on both ends of the electrode assembly 10 in the stacking direction thereof as the foil electrodes 11, and a plurality of bipolar electrodes 11b that are disposed between the terminal electrodes 11n, 11p. In addition, the electrode assembly 10 is impregnated with electrolyte.

The bipolar electrodes 11b each have the metal foil 2 which is formed in a rectangular shape, a positive electrode active material layer 3p that is provided on one surface of the metal foil 2 as the active material layer 3, and a negative electrode active material layer 3n that is provided on the other surface of the metal foil 2 as the active material layer 3. The positive electrode active material layer 3p and the negative electrode active material layer 3n are provided in an area inside of a circumferential edge portion 21 of the metal foil 2. In addition, the circumferential edge portion 21 of the metal foil 2 is held by the seal member 13. Specifically, the metal foil 2 of the present example is a nickel foil of a thickness of 50 μm.

Referring to FIG. 2, each positive electrode active material layer 3p contains a large number of positive electrode active material particles 32p. The fitting portions 31 of the positive electrode active material layer 3p are spaces between the positive electrode active material particles 32p. The positive electrode active material layer 3p contains 95 parts by mass of nickel hydroxide as the positive electrode active material particles 32p, 1 part by mass of metallic cobalt as a conductive assistant, 2 parts by mass of styrene-butadiene rubber as a binder, 1 part by mass of carboxymethyl cellulose as a thickener, and 1 part by mass of $Y_2O_3$ as an antioxidant.

A surface of the nickel hydroxide as the positive electrode active material particles 32p is coated with cobalt oxide, although the illustration is omitted. The 50% cumulative particle size of the positive electrode active material particles 32p based on volume is 15 μm. It is noted that descriptions of the conductive assistant, the binder, the thickener, and the antioxidant in FIG. 2 are omitted as a matter of convenience.

A weight of each positive electrode active material layer 3p, that is, a mass per unit area is 30 mg/cm². The positive electrode active material layer 3p has a thickness of 100 μm. In addition, apparent density of the positive electrode active material layer 3p, that is, density including pores of the positive electrode active material layer 3p is 3.0 g/cm³.

Each negative electrode active material layer 3n contains a large number of negative electrode active material particles. The negative electrode active material layer 3n contains 96 parts by mass of hydrogen storage alloy as the negative electrode active material particles, 3 parts by mass of styrene-butadiene rubber as a binder, and 1 part by mass of carboxymethyl cellulose as a thickener.

Each negative electrode active material layer 3n has a weight of 45 mg/cm² and a thickness of 90 μm. In addition, apparent density of the negative electrode active material layer 3n is 5.0 g/cm³.

Referring to FIG. 1, the first terminal electrode 11p which is disposed on one end of the electrode assembly 10 in the stacking direction thereof, of the two terminal electrodes 11n,11p, has the same configuration as the bipolar electrodes 11b, except for not having the negative electrode active material layer 3n. In addition, the second terminal electrode 11n which is disposed on the other end of the electrode assembly 10 in the stacking direction thereof, has the same configuration as the bipolar electrodes 11b, except for not having the positive electrode active material layer 3p.

These foil electrodes 11 are arranged in such a manner that the positive electrode active material layers 3p and the negative electrode active material layers 3n are alternately arranged in the stacking direction of the electrode assembly 10. In addition, each separator 4 is interposed between the positive electrode active material layer 3p and the negative electrode active material layer 3n. With this configuration, a cell unit C in which one positive electrode active material layer 3p and one negative electrode active material layer 3n face each other with the separator 4 interposed therebetween is configured between two adjacent metal foils 2. In addition, in the electrode assembly 10 of the present example, a plurality of cell units C are electrically connected in series with the metal foil 2 interposed therebetween.

As shown in FIG. 2, the separators 4 of the present example, are each a nonwoven fabric which is formed by fibers 42 made of polyolefin in a rectangular shape. An average hole diameter of the separators 4 of the present example is 10 μm, and an average fiber diameter of the separators 4 is 5 μm.

Figure 3:
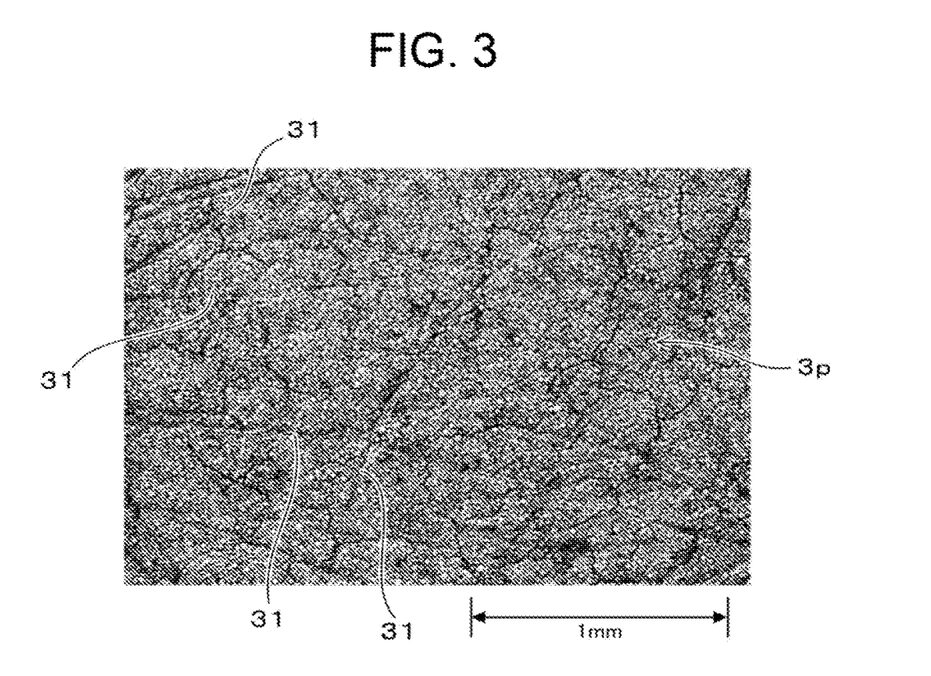
FIG. 3 is a picture instead of a drawing that shows the positive electrode active material layer in which the mesh-like fitting portion is formed according to the first embodiment.

The protruding portions 41 of each separator 4 of the present example are parts of the fibers 42 that are exposed on the surface of the separator 4. As an example illustrated in FIG. 2, the fibers 42 as the protruding portions 41 are pressed into spaces between the positive electrode active material particles 32p in the positive electrode active material layers 3p, and the parts of the fibers 42 are embedded into the spaces between the positive electrode active material particles 32p. With this configuration, the fibers 42 as the protruding portions 41 are engaged with the spaces between the positive electrode active material particles 32p as the fitting portions 31. As shown in FIG. 3, the fitting portions 31 of the present example are formed in a mesh-like shape.

The bundling members 12 made of metal are disposed on both ends of the electrode assembly 10 in the stacking direction thereof. The bundling members 12 are held by holding plates which are not illustrated while the bundling members 12 come in contact with the metal foils 2 of the terminal electrodes 11n, 11p. The electrode assembly 10 of the present example is formed in such a manner that the electrode assembly 10 may be electrically connected with an external circuit via the bundling members 12.

The alkaline storage battery 1 of the present example 1 may be manufactured by, for example, the following method. Firstly, a stacking process in which the foil electrodes 11 (11b,11n, 11p) and the separators 4 are alternately stacked with each other, and impregnated with electrolyte is performed. In the present example, after the foil electrodes 11 and the separators 4 are alternately stacked with each other to manufacture the electrode assembly 10, the foil electrodes 11 and the separators 4 are impregnated with the electrolyte injected from a liquid injection port which is not illustrated.

Then, a compressing process in which the electrode assembly 10 is compressed in the stacking direction of the electrode assembly 10 is performed, so that the fibers 42 that are exposed on the surface of each separator 4 are pressed into the spaces between the positive electrode active material particles 32p, for example, as illustrated in FIG. 2. From the above results, the protruding portions 41 may be engaged with the fitting portions 31 by embedding the fibers 42 as the protruding portions 41 into the spaces between the positive electrode active material particles 32p as the fitting portions 31. As shown in FIG. 3, the fitting portions 31 of the present example are formed in a groove shape and recessed, because the fitting portions 31 are pressed by the fibers 42 as the protruding portions 41.

The following will describe advantages of the alkaline storage battery 1 of the present example. The alkaline storage battery 1 of the present example has the plurality of foil electrodes 11 and the plurality of separators 4, which are alternately stacked with each other. Each separator 4 has the protruding portions 41 that protrude toward the positive electrode active material layers 3p of the foil electrodes 11, and the positive electrode active material layer 3p has the fitting portions 31 into which the protruding portions 41 of the separator 4 are fitted. The protruding portions 41 of the separator 4 are engaged with the fitting portions 31 of the positive electrode active material layer 3p. Thus, the separator 4 is held on the positive electrode active material layer 3p by engaging the separator 4 with the positive electrode active material layer 3p, thereby restraining formation of space between the separator 4 and the positive electrode active material layer 3p.

In addition, as described above, in the alkaline storage battery 1, each separator 4 is held on the positive electrode active material layer 3p by the engagement of the protruding portions 41 of the separator 4 and the fitting portions 31 of the positive electrode active material layer 3p. This configuration need not have a layer, such as an adhesive agent layer which is disposed between the separator 4 and the positive electrode active material layer 3p and improves the adhesion therebetween. Therefore, in the alkaline storage battery 1, the electrolyte may be quickly supplied to the active material layer 3 from the separator 4.

The separators 4 are a nonwoven fabric including a large number of fibers 42. The positive electrode active material layers 3p have a large number of the positive electrode active material particles 32p which adhere to each other and the spaces formed between the positive electrode active material particles 32p. In addition, the fibers 42 as the protruding portions 41 are engaged with the spaces between the positive electrode active material particles 32p as the fitting portions 31. Thus, the protruding portions 41 and the fitting portions 31 may be formed and the protruding portions 41 are engaged with the fitting portions 31 by a simple process, in which the electrode assembly 10 is compressed in the stacking direction of the electrode assembly 10 without providing the protruding portions 41 and the fitting portions 31 in advance, due to a combination of a material of the separators 4 and a configuration of the positive electrode active material layers 3p. Therefore, a complication of manufacturing processes caused by works of providing the protruding portions 41 in the separators 4 and the fitting portions 31 in the positive electrode active material layers 3p may be avoided.

In addition, the fibers 42 of each separator 4 are pressed into the spaces between the positive electrode active material particles 32p by pressing the separator 4 made of nonwoven fabric into the positive electrode active material layer 3p containing a large number of the active material particles, so that the mesh-like protruding portions 41 and fitting portions 31 may be formed. As a result, the separator 4 is more firmly held on the positive electrode active material layer 3p, so that the formation of the space between the separator 4 and the positive electrode active material layer 3p adjacent to the separator 4 is restrained more effectively.

The positive electrode active material layer 3p of the present example contains the positive electrode active material particles 32p which have the 50% cumulative particle size of 15 μm based on volume. In addition, the average hole diameter of the separators 4 is 10 μm, and the average fiber diameter of the separators 4 is 5 μm. Thus, the 50% cumulative particle size D [μm] of the positive electrode active material particles 32p based on volume, the average hole diameter A [μm] of the separators 4, and the average fiber diameter B [μm] of the separators 4 satisfy the relationship of the following expression (1).

$$0.2 < D/(A+B) < 1.5 \qquad (1)$$

When the foil electrodes 11 and the separators 4 of the present example are alternately stacked with each other, an average space between the fibers 42 that are exposed on the surface of each separator 4, that is, a sum of the above-described average hole diameter A and average fiber diameter B becomes almost the same size as an average space between the positive electrode active material particles 32p that are exposed on the surface of each positive electrode active material layer 3p, that is, the 50% cumulative particle size D [μm] of the positive electrode active material particles 32p. Thus, as an example illustrated in FIG. 4, the spaces between the positive electrode active material particles 32p are easy to be matched with the spaces between the fibers 42 of the separator 4.

Figure 4:
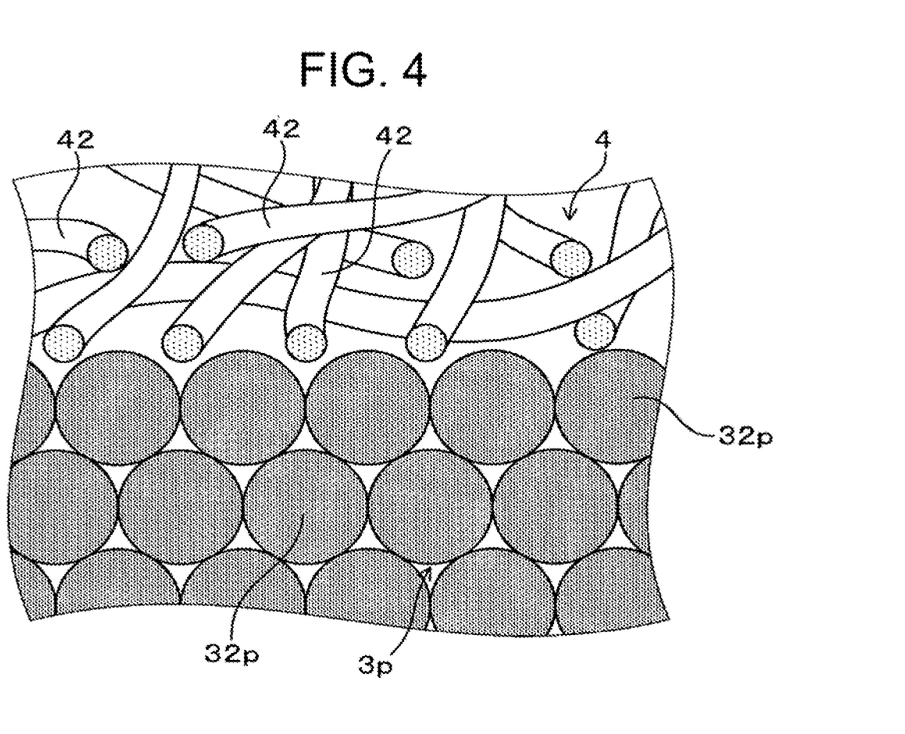
FIG. 4 is a partially enlarged cross-sectional view illustrating an interface between the separator and the positive electrode active material layer before a compressing process is performed according to the first embodiment.

Therefore, the fibers 42 that are exposed on the surface of each separator 4 are easily entered into the spaces between the positive electrode active material particles 32p by compressing the electrode assembly 10, and furthermore, more easily pressed into the spaces between the positive electrode active material particles 32p. As a result, the separator 4 is more firmly held on the positive electrode active material layer 3p, so that the formation of the space between the separator 4 and the positive electrode active material layer 3p adjacent to the separator 4 is restrained more effectively.

Furthermore, the average fiber diameter of the separators 4 of the present example is smaller than the 50% cumulative particle size D of the positive electrode active material particles 32p. Thus, for example, as shown in FIG. 4, the fibers 42 of each separator 4 are easy to be entered into the spaces between the positive electrode active material particles 32p that are present on the surface of the positive electrode active material layers 3p. Thus, parts of the fibers 42 of the separator 4 may be easily pressed into the spaces between the positive electrode active material particles 32p which are present on the surface of the positive electrode active material layers 3p by compressing the electrode assembly 10. As a result, the separator 4 is more firmly held on the positive electrode active material layer 3p, so that the formation of the space between the separator 4 and the positive electrode active material layer 3p adjacent to the separator 4 is restrained more effectively.

In addition, each positive electrode active material layer 3p of the present example contains carboxymethyl cellulose. The positive electrode active material layer 3p containing the carboxymethyl cellulose tends to be softened by impregnating the positive electrode active material layer 3p with electrolyte, compared with the positive electrode active material layer 3p before impregnation with electrolyte. Thus, the fibers 42 of each separator 4 are more easily pressed into the spaces between the positive electrode active material particles 32p by compressing the electrode assembly 10 after the positive electrode active material layer 3p is impregnated with the electrolyte. As a result, the separator 4 is more firmly held on the positive electrode active material layer 3p, so that the formation of the space between the separator 4 and the positive electrode active material layer 3p adjacent to the separator 4 is restrained more effectively.

The negative electrode active material layers 3n of the present example are harder than the positive electrode active material layers 3p, because the negative electrode active material layers 3n have higher apparent density than that of the positive electrode active material layers 3p. Thus, when the electrode assembly 10 is compressed in the stacking direction of the electrode assembly 10 in the compressing process, each separator 4 is held by the negative electrode active material layer 3n, thereby further increasing a load applied to press the separator 4 into the positive electrode active material layer 3p. As a result, the protruding portions 41 and the fitting portions 31 may be easily formed.

As described above, in the alkaline storage battery 1 of the present example, the formation of the space between each separator 4 and the active material layer 3 adjacent to the separator 4 may be restrained, and electrolyte is quickly supplied to the active material layer 3 from the separator 4.

Example 2

The present example is an example of separators 402 in which protruding portions 43 are formed in advance. It is noted that identical reference numerals used in the present example to the reference numerals in the above-described example 1 show the identical components to the components in the above-described example 1, unless otherwise described.

Figure 5:
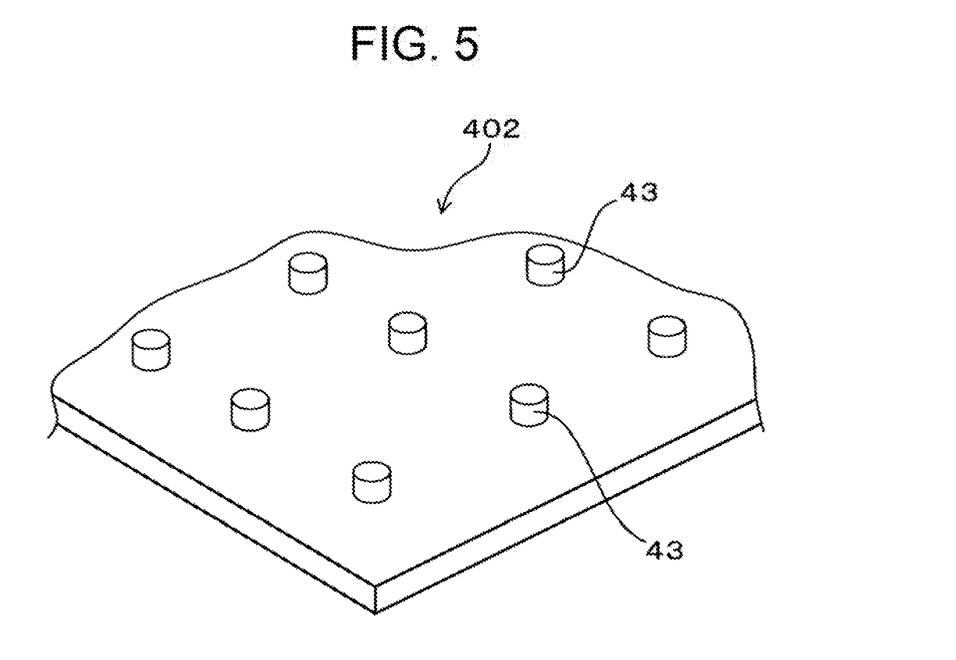
FIG. 5 is a perspective view of a separator according to a second embodiment.

Each separator 402 of the present example is a nonwoven fabric which is formed by fibers made of polyolefin. Referring to FIG. 5, the separator 402 has a plurality of protruding portions 43 each of which is formed in a columnar shape.

Figure 6:
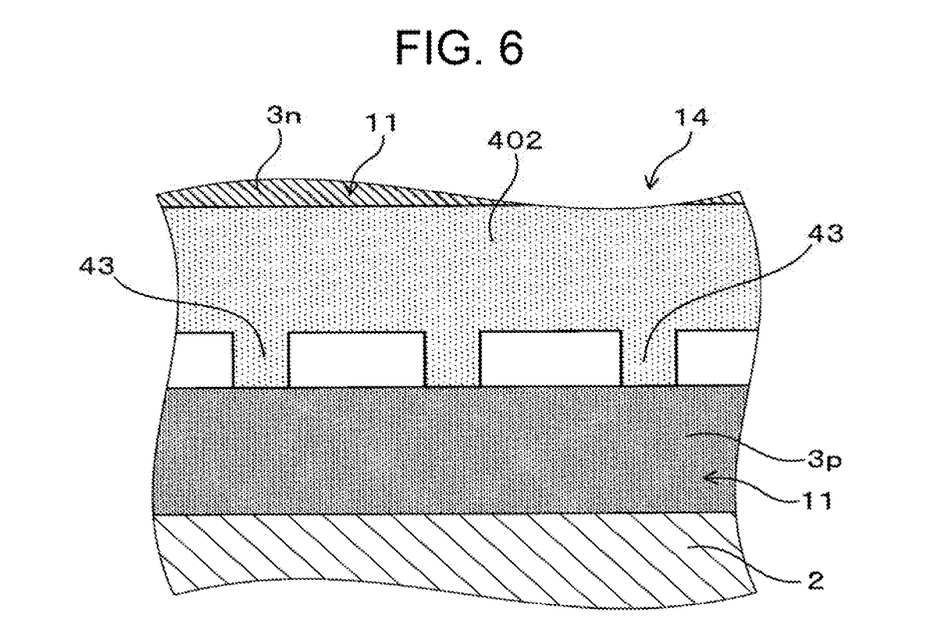
FIG. 6 is a partially enlarged cross-sectional view illustrating an interface between the separator and a positive electrode active material layer before a compressing process is performed according to the second embodiment.

A manufacturing method of an alkaline storage battery 102 using the separators 402 of the present example is the same as that in the example 1. That is, firstly, the stacking process in which the foil electrodes 11 and the separators 402 are alternately stacked with each other, and impregnated with electrolyte is performed. In the present example, as shown in FIG. 6, the foil electrodes 11 and the separators 402 are alternately stacked with each other to manufacture an electrode assembly 14 in such a manner that the protruding portions 43 of each separator 402 come in contact with the positive electrode active material layer 3p adjacent to the separator 402.

Figure 7:
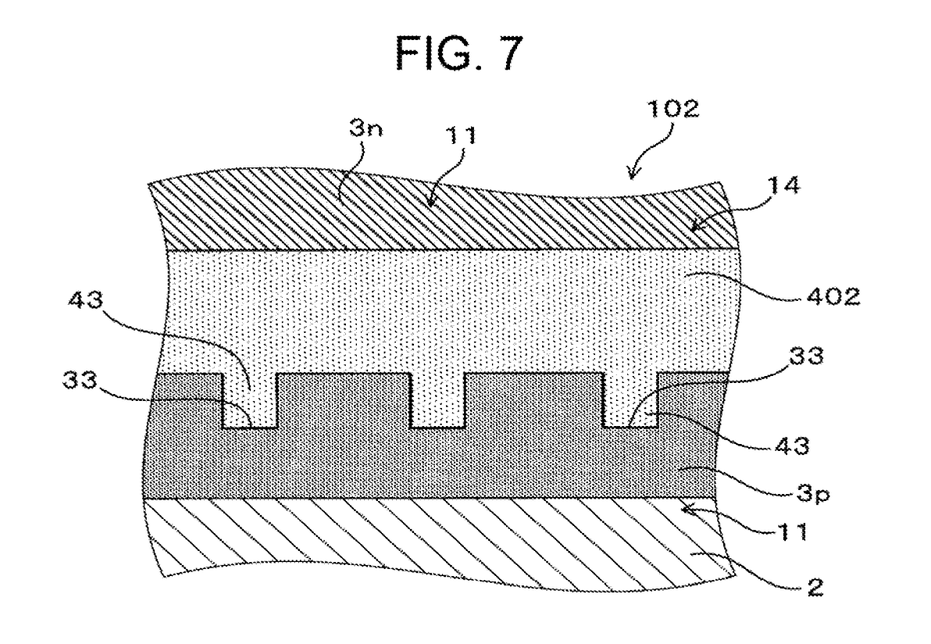
FIG. 7 is a partially enlarged cross-sectional view illustrating an interface between the separator and the positive electrode active material layer after the compressing process has been completed according to the second embodiment.

Then, the compressing process in which the electrode assembly 14 is compressed in the stacking direction of the electrode assembly 14 is performed. With this process, as shown in FIG. 7, the protruding portions 43 are pressed into the positive electrode active material layer 3p. As a result, the protruding portions 43 of each separator 402 are entered into the fitting portions 33, while the fitting portions 33 are formed in the positive electrode active material layer 3p adjacent to the separator 402, so that the protruding portions 43 are engaged with the fitting portions 33.

In the alkaline storage battery 102 of the present example, formation of space between each separator 402 and the positive electrode active material layer 3p adjacent to the separator 402 may be restrained, because the protruding portions 43 of the separator 402 and the fitting portions 33 of the positive electrode active material layer 3p are engaged with each other. In addition, the alkaline storage battery 102 of the present example need not have other layer, between the separator 402 and the positive electrode active material layer 3p, such as an adhesive agent layer. Therefore, electrolyte may be quickly supplied from the separator 402 to the active material layer 3.

Example of Experiment

The present example is an example of an experiment of the alkaline storage battery 1 in which the 50% cumulative particle size of the positive electrode active material particles 32p, the average hole diameter of the separators 4, and the average fiber diameter of the separators 4 are variously changed. In the present example, the alkaline storage batteries 1 (Samples A1 to A5) which have the 50% cumulative particle size of the positive electrode active material particles 32p, the average hole diameter of the separators 4, and the average fiber diameter of the separators 4 shown in FIG. 1 were manufactured.

These samples were charged at a charging rate of 1C under 45 degrees Celsius. The charging was finished in 1 hour after the charging was started, that is, at the time when SOC (State of Charge) reached 100%. Then, in this state, internal pressure of each cell unit C in the samples was measured. A maximum value of the internal pressure of the cell unit C in each sample is shown in FIG. 1.

TABLE 1

| Symbol of sample | 50% cumulative particle size D of positive electrode active material particles (μm) | Average hole diameter A of separators (μm) | Average fiber diameter B of separators (μm) | D/(A + B) | Maximum value of internal pressure (MPa) |
|---|---|---|---|---|---|
| A1 | 15 | 10 | 5 | 1.00 | 0.1 |
| A2 | 10 | 25 | 10 | 0.29 | 0.1 |
| A3 | 20 | 10 | 4 | 1.43 | 0.1 |
| A4 | 25 | 10 | 5 | 1.67 | 0.4 |
| A5 | 7 | 35 | 15 | 0.14 | 0.3 |

As shown in FIG. 1, the 50% cumulative particle size D [μm] of the positive electrode active material particles 32p based on volume, the average hole diameter A [μm] of the separators 4, and the average fiber diameter B [μm] of the separators 4 in Samples A1 to A3 satisfied the relationship of the following expression (1).

$$0.2 < D/(A+B) < 1.5 \qquad (1)$$

Thus, the maximum values of each cell unit C in these samples when the charging was finished became smaller than those in Samples A4 and A5 which did not satisfy the relationship of the above-described expression (1). From these results, it can be understood that each separator 4 is more firmly held on the positive electrode active material layer 3p, when the 50% cumulative particle size D [μm] of the positive electrode active material particles 32p based on volume, the average hole diameter A [μm] of the separators 4, and the average fiber diameter B [μm] of the separators 4 satisfy the above-described expression (1), so that the internal pressure of each cell unit C may be restrained from being increased.

It is noted that the specific embodiment of the alkaline storage battery and the method of manufacturing the alkaline storage battery according to the present invention is not limited to the above-described embodiments of the examples 1 and 2, and may be changed in the configuration of the alkaline storage battery as appropriate within the gist of the present invention.

REFERENCE SIGNS LIST 1, 102 alkaline storage battery
11 foil electrode
2 metal foil
3 active material layer
31, 33 fitting portion
4, 402 separator
41, 43 protruding portion

The invention claimed is:

1. An alkaline storage battery comprising:
a plurality of foil electrodes that each have a metal foil and an active material layer that is disposed on one surface or both surfaces of the metal foil, the plurality of the foil electrodes in which the active material layers are arranged in such a manner that adjacent two of the active material layers face each other; and
separators which are each interposed between the adjacent two of the active material layers, wherein
the separators are each a nonwoven fabric including a plurality of fibers as protruding portions which protrude toward the active material layers,
the active material layers have:
a plurality of active material particles which adhere to each other; and
spaces formed between the active material particles, as fitting portions into which the protruding portions of the separators are fitted,
the fibers are engaged with the spaces while the fibers enter the spaces,
a 50% cumulative particle size D [μm] of the active material particles based on volume, an average hole diameter A [μm] of the separators, and an average fiber diameter B [μm] of the separators satisfy a relationship of the following expression (1):

$$0.2 < D/(A+B) < 1.5 \qquad (1)$$

wherein the 50% cumulative particle size D [μm] of the active material particles based on the volume is 3 to 50 μm,
wherein the average fiber diameter B [μm] of the separators is 2 to 10 μm, and
wherein the average hole diameter A [μm] of the separators is 10 to 25 μm.

2. The alkaline storage battery according to claim 1, wherein
the average fiber diameter B [μm] of the separators is smaller than the 50% cumulative particle size D [μm] of the active material particles based on the volume.

3. The alkaline storage battery according to claim 1, wherein
carboxymethyl cellulose is contained in the active material layers.

4. The alkaline storage battery according to claim 1, wherein
the foil electrodes are a bipolar electrode that has a positive electrode active material layer as the active material layers disposed on one surface of the metal foils and the negative electrode active material layer as the active material layers disposed on the other surface of the metal foils.

5. A method of manufacturing the alkaline storage battery according to claim 1, comprising:
a stacking process in which the foil electrodes and the separators are alternatively stacked with each other to manufacture an electrode assembly, and impregnated with electrolyte; and
a compressing process in which portions of the separators are pressed into the active material layers by compressing the electrode assembly in a stacking direction thereof, so that the protruding portions and the fitting portions are engaged with each other.

\* \* \* \* \*